US008727820B2

(12) United States Patent
Stasolla et al.

(10) Patent No.: US 8,727,820 B2
(45) Date of Patent: May 20, 2014

(54) HYBRID DRIVE SYSTEM FOR A SHIP

(75) Inventors: Paolo Stasolla, Bari (IT); Andrea Pellegrinetti, Malcesine VR (IT); Adriano Zanfei, Madrano (TN) (IT); Michele Zottele, Trento (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 297 days.

(21) Appl. No.: 13/262,963

(22) PCT Filed: Dec. 3, 2009

(86) PCT No.: PCT/EP2009/066327
§ 371 (c)(1),
(2), (4) Date: Oct. 5, 2011

(87) PCT Pub. No.: WO2010/115479
PCT Pub. Date: Oct. 14, 2010

(65) Prior Publication Data
US 2012/0028515 A1 Feb. 2, 2012

(30) Foreign Application Priority Data
Apr. 7, 2009 (DE) .......................... 10 2009 002 264

(51) Int. Cl.
*B63H 21/20* (2006.01)
*B63H 21/21* (2006.01)
*B60W 10/04* (2006.01)

(52) U.S. Cl.
USPC .................................. 440/3; 440/84; 440/87

(58) Field of Classification Search
USPC ........................ 440/3, 7, 51, 79, 83, 84, 87
See application file for complete search history.

(56) References Cited

U.S. PATENT DOCUMENTS 3,238,911 A * 3/1966 Pazulski et al. ............ 114/39.21
3,411,013 A * 11/1968 Vogelsang .................... 290/4 R
3,619,632 A   11/1971 Labombarde
(Continued)

FOREIGN PATENT DOCUMENTS

AT  008 288 U1  5/2006
DE  75 08 341 U  9/1975
(Continued)

OTHER PUBLICATIONS

Iskra Avtoelektrika, D.D, Integrated Starter Motor Generators, Mar. 2008 See Spec., p. 5.

*Primary Examiner* — Stephen Avila
*Assistant Examiner* — Anthony Wiest
(74) *Attorney, Agent, or Firm* — Davis & Bujold, PLLC; Michael J. Bujold

(57) ABSTRACT

A hybrid drive system for a ship, designed as a parallel hybrid drive system, and comprising an internal combustion engine (103), an electric machine (105), acting as a generator or motor, depending on switching an electric controller (107), a battery (106), at least one switching clutch (115, 116), and a drive device (109) for transferring the drive power to at least one propeller (108). The electric machine (105) together with a first (115) and a second switched clutch (116), form a drive unit (140), that can be modularly disposed between the internal combustion engine (103) and the drive device (109). The first switched clutch (115) is disposed between the electric machine (105) and the internal combustion engine (103) and the second switched clutch (116) is disposed between the electric machine (105) and the drive device (109).

14 Claims, 5 Drawing Sheets

(56) References Cited

U.S. PATENT DOCUMENTS

| | | | |
|---|---|---|---|
| 6,396,161 B1 * | 5/2002 | Crecelius et al. | 290/36 R |
| 7,473,149 B2 | 1/2009 | Mizokawa | |
| 8,062,081 B2 * | 11/2011 | Barrett et al. | 440/1 |
| 2006/0000685 A1 * | 1/2006 | Puiu | 192/85 AA |
| 2008/0113570 A1 | 5/2008 | Kaji | |
| 2009/0209146 A1 | 8/2009 | Jegel | |

FOREIGN PATENT DOCUMENTS

| | | |
|---|---|---|
| DE | 41 05 318 A1 | 8/1992 |
| DE | 10 2008 024 540 A1 | 12/2009 |
| EP | 1 520 782 A2 | 4/2005 |
| EP | 1 669 287 A1 | 6/2006 |
| EP | 1 914 161 A2 | 4/2008 |
| EP | 2 082 955 A1 | 7/2009 |
| SI | 22377 A | 4/2008 |

* cited by examiner

HYBRID DRIVE SYSTEM FOR A SHIP

This application is a National Stage completion of PCT/EP2009/066327 filed Dec. 3, 2009, which claims priority from German patent application serial no. 10 2009 002 264.3 filed Apr. 7, 2009.

FIELD OF THE INVENTION

The invention relates to a hybrid drive system for a ship, in particular a sailing ship hybrid drive or a motor ship hybrid drive, and a method for operating the hybrid drive system.

BACKGROUND OF THE INVENTION

An internal combustion engine to drive a ship or motor vehicle is operated using a broad load and rotational speed range, where the lowest fuel consumption by the internal combustion engine is attained in a very narrow rotational speed and torque range. The surface of the fuel consumption map is characterized as a range of minimum consumption. Outside of the range of minimum consumption, the internal combustion engine operates with unfavorable efficiency and, thus, high fuel consumption. So-called hybrid drives were developed with the goal of fuel savings, in which an internal combustion engine was combined with at least one electric machine, wherein along with a fuel tank for the internal combustion engine, a battery is provided for storing electrical energy. Here a battery is understood to be any electrical energy storage, including, for example capacitive storage. With a hybrid drive system, because the internal combustion engine can be decoupled from the output drive, it is possible to operate the internal combustion engine as required in or near the range of minimum consumption in its fuel consumption map. For other driving conditions, the output drive occurs using the electric machine. Furthermore, in a hybrid drive system, energy recovery or energy recuperation is possible; as a result of the mechanical connection of the output drive and the electric machine, in certain operating conditions, such as during braking or downhill travel of motor vehicles, the electric machine can be driven from the output drive side. Regenerative energy generation is possible with ships too, using solar energy or wind energy. In a motor ship it is possible to utilize the wind energy only using a wind turbine; in contrast, in an application as a drive of a sailing ship, such recuperation can occur using the drive of the electric machine acting as a generator in sailing mode by using the propeller acting as a turbine. Furthermore, it is possible to use the flow energy of the water flowing around the ship in both a motor ship as well as in a sailing ship in flowing waters. The generated electrical energy can be used directly or stored in an electrical energy accumulator. Even sailing ships depend on a drive under specific situations, such as during calm conditions or during docking and casting-off maneuvers. The drive can then occur using a hybrid drive system, alternatively electrically or using an internal combustion engine or a combination of the two.

A ship drive is known which is designed as a so-called "diesel-electric" drive. In this case, an internal combustion engine drives a generator; electrical energy generated by this generator drives an electric motor. The electric motor, in turn, drives a propeller shaft. With this, the internal combustion engine is mechanically decoupled from the propeller shaft, and can be operated advantageously with the drive of a generator in normal mode or close to the minimum consumption range. Furthermore, the arrangement of the internal combustion engine is not connected to the propeller shaft, and can be disposed practically anywhere in the ship's hull.

A disadvantage of this diesel-electric drive is that at low speeds, the internal combustion engine can only be operated at low load, and therefore no longer in the range of minimum consumption. The double energy conversion is a further disadvantage, as are the conversion losses associated with it. In the ideal case, the internal combustion engine can be driven constantly in its minimum consumption range, however the conversion in the generator of mechanical energy into electrical energy, and the subsequent conversion in the electric motor of electrical energy into mechanical energy reduces efficiency. Through these losses, the consumption advantage of the internal combustion engine driven statically in the range of minimum consumption can be reduced or overcompensated.

Strictly speaking, according to the definition, this is not a real hybrid drive system because there is no possibility of storing the electrical energy generated by the generator. As a result, the internal combustion engine must be operated constantly to drive the propeller, and this is associated with all of the negative effects such as exhaust and noise emissions. In an application in a sailing ship, the electrical energy accumulator cannot be charged during sailing mode or using flows.

Furthermore, a so-called "serial hybrid drive" of a ship is known from the prior art, whose design is similar to that of the diesel-electric drive. However, the serial hybrid drive, in addition to the generator and electric motor, also has a battery as a storage possibility for the electrical energy generated by the generator. As a result, more drive variants are possible. Thus, during normal travel or with heavy loads or at high ship speeds, the drive uses "diesel-electric" because the internal combustion engine can be operated in its minimum consumption range under these operating conditions. The internal combustion engine can also be arranged anywhere within the ship's hull.

As with the diesel-electric drive, a disadvantage of the serial hybrid during normal travel is the double energy conversion and the resulting conversion losses associated with it. Due to these losses, the consumption advantage of the internal combustion engine operating statically in the minimum consumption range can be reduced or overcompensated.

If the internal combustion engine is not utilized completely to capacity by the propeller drive, the battery can be charged using the excess torque. With low load or at slow ship speeds, the internal combustion engine is switched off, and the propeller is driven using the electric motor supplied by the battery. The purely electric drive of the ship offers additional advantages of emission-free maneuvering in the harbor, and makes it possible to operate in an environmentally friendly manner with respect to exhaust and noise emissions. The internal combustion engine is only switched on again to charge the battery when it falls below a specific charging state.

For a sailing ship, the described hybrid drive system makes it possible to charge the battery while sailing or to generate current, in that the propeller acts as a turbine, and the electric machine, operated as a generator, provides the drive. Additionally, it is also possible to charge the battery from the power network while in port. The hybrid drive system is monitored and controlled by an electronic control unit.

A further variant of a hybrid drive system for a ship is the so-called "parallel hybrid drive system". In contrast to the serial hybrid drive system, in this case the internal combustion engine is not mechanically decoupled from the propeller. The parallel hybrid drive system comprises an electrical energy accumulator, for example a battery, and an electric machine operating, according to control, only as an engine or generator in contrast to the serial hybrid and the diesel-electric drive. Furthermore, the parallel hybrid drive system has a mechanical switchgear which consists of an arrangement of clutches, for example. The drive can occur electrically, or using the internal combustion engine, or using a combination of the two.

Different operating modes of the drive can be set using the mechanical switchgear and its control by an electronic control unit. Thus, the internal combustion engine can drive the propeller directly, which preferably occurs in those operating states in which the internal combustion engine operates in or near the minimum consumption range, for example during normal travel or at high required drive torques. In comparison to the serial hybrid, there are no losses in efficiency as a consequence of a mechanical-electrical-mechanical energy conversion. If the internal combustion engine is not completely loaded with the drive of the propeller, in a further setting of the mechanical switchgear and power electronics, the internal combustion engine can drive the electric machine in the generator mode and charge the battery. If the ship is moving at slow speed or in maneuvering mode, or if the surroundings require quiet and exhaust-free operation, then the mechanical switchgear produces only the mechanical connection between the electric motor and propeller. The internal combustion engine is now switched off. In this switch setting of the mechanical switchgear, it is also possible with appropriate control by the electronic control unit that in sailing mode the propeller acts as a turbine and drives the electric machine as a generator in order to charge the battery. An environmentally friendly and renewable energy source is possible using this so-called recuperation. In the process, the internal combustion engine can be switched off. In a further mode of operation in which short-term high drive power is required, due to the switch setting of the mechanical switchgear, both the internal combustion engine and the electric motor can act on the propeller and thus add their power ("boost" mode). As a result, with the same maximum drive power as in the mode using purely the internal combustion engine, the internal combustion engine can be unloaded by the additional power from the electric motor, or a peak need of drive power can be covered.

A parallel hybrid drive system for a ship is known from the document SI 22377A; this parallel hybrid drive system has an electric machine with a first clutch, a battery, an electronic control unit and a drive unit with a second clutch and a converter charging unit. In this case, the first clutch is disposed between the internal combustion engine and the electric machine, and the second clutch is disposed between the electric machine and the propeller shaft.

The "Integrated Starter Motor Generators" catalog from Iskra Avtoelektrika, the owner of the document SI 22377 A, shows a ship drive system that has a parallel hybrid drive system such as that of SI 22377 A, and comprises a rear drive as a drive device. In the rear drive, a double redirection of the drive train to the propeller occurs using two V drives. The first clutch is designed as a multi-disk clutch or claw clutch. The following operating modes can be set using this parallel hybrid drive system: in a start mode, the first clutch is engaged and the second clutch is disengaged. In this case, the electric machine acts as a starter and places the internal combustion engine in gear. As soon as the internal combustion engine is running, the drive system automatically switches by means of the electronic control unit into the generator mode, in which likewise the first clutch is engaged in the second clutch is disengaged. The internal combustion engine drives the electric machine acting as a generator, and charges the battery. Optionally, while the ship is in port, the battery can be charged from the power network using a converter charging unit of the power electronics. In the electric drive mode, the first clutch is disengaged and the internal combustion engine is stopped. The second clutch is engaged so that the electric machine, now acting as a motor, drives the propeller. In a so-called boost mode, both clutches are engaged and the electric machine and the internal combustion engine operate in parallel. The sum of the drive power from both machines drives the propeller.

A reversal of the propeller direction, which is necessary for reversing the direction of travel of the ship during docking and casting-off maneuvers, for example, is attained with the rear drive shown by shifting the double cone clutch. This shifting is only possible however, if the direction of rotation of the electric machine corresponds with that of the internal combustion engine. If the reversal of the direction of rotation of the propeller in the purely electric mode is to occur by an easy to implement reversal of rotation of the electric machine, the double cone clutch, due to its constructive design, disengages like a freewheel, and disadvantageously cannot transfer any drive torque to the propeller. Therefore, the second clutch cannot be shifted at will, and in this sense in not a clutch.

Hydraulically actuated clutches, which are also used in rear drives or ship drives with undeflected drive trains, have several disadvantages. In the event of a leak for example, operating media, which is environmentally hazardous and critical to operational safety, can leak out of hydraulic lines and machines. In addition, in order to generate oil pressure, a hydraulic system requires at least one pump that is an additional component and that uses part of the drive power generated by the ship's drive, which, in purely electric mode, requires energy from the battery and therefore shortens the possible runtime of the electric machine. If the pump is mechanically driven by the electric machine, it is not possible to reverse the direction of rotation of the electric machine because in most displacement pumps, reversing the direction of rotation also reverses the direction of conveying. Pumps that are independent of the direction of rotation, such as radial piston pumps, are complex and expensive. For this reason, the direction of rotation of the electric motor driving the pump cannot be changed even in electric mode, so that a mechanical switching of the direction of rotation of the pump is required. Although a pump driven by its own electric motor (e-pump) can function independently of the direction of rotation of the electric machine, an e-pump is complex and due to the double conversion of energy, operates at a poor degree of efficiency.

As a further disadvantage, the rotational speed of the electric motor can only be lowered to a minimum rotational speed at which the pump still conveys the operating media and can generate pressure. As a result, a major advantage of the electric drive during maneuvering, or docking and casting-off is nullified, and convenience is compromised.

The document EP 1 914 161 A2 shows a parallel hybrid drive system for ships. No second clutch is disposed between an electric machine acting as an electric motor and drive mechanism or propeller. Generating electrical current by operating the electric machine only as a motor is not possible; a separate generator is provided for this, which means additional expenditures of construction space, cost and weight.

The document EP 1 669 287 A1 does not disclose a clutch between the internal combustion engine and electric machine. A shiftable clutch for switching the direction of rotation of the propeller is present in the drive mechanisms. A purely electric drive is disadvantageously not possible.

The patent application US 2008/0113570 show an outboard motor as a hybrid drive system for a ship which has an internal combustion engine, an electric motor acting also as a generator and a drive mechanism. A claw clutch is needed to reverse the direction of rotation of the propeller in order to change the direction of travel.

SUMMARY OF THE INVENTION

The problem addressed by the invention is to create a compact, electrically reversible hybrid drive system to drive a ship, and to specify a method for operating the hybrid drive system.

Accordingly, a hybrid drive system for a ship, in particular a sailing ship hybrid drive or a motor ship hybrid drive, is designed as a parallel hybrid drive system and comprises an internal combustion engine and an electric machine, which acts as a generator or a motor according to the circuit of an electric controller. In addition, the hybrid drive system also includes a battery, at least one switchgear and a drive device for transferring the drive power to at least one propeller. In this case, the electric machine, together with a first and a second clutch, forms a drive unit which can be disposed modularly between the internal combustion engine and the drive device. Within the drive unit the first clutch is disposed between the electric machine and the internal combustion engine, and the second clutch is disposed between the electric machine and the drive device.

This results in a compact construction of the hybrid drive with easy assembly and very easy maintenance. Furthermore, due to the central arrangement of the two clutches, all operating functions of the hybrid drive system can be implemented. An additional clutch outside of the drive unit in another component such as the drive device, for example, is not required.

In one embodiment of the invention, an output shaft of the internal combustion engine can be coupled to a rotor shaft of the electric machine by means of the first clutch, and the rotor shaft of the electric machine can be coupled to an input shaft of the drive device by means of the second clutch.

According to a further embodiment, power electronics are disposed at the drive unit as an electrical controller for charging and discharging the electrical storage device, and for switching the electric machine between operation as a generator or as a motor. A compact unit is formed due to the direct arrangement or fastening of the power electronics to the drive unit. The routing of the electrical lines within the ship, which is prone to failure, is omitted due to the direct short connection. Furthermore, lines for cooling the drive unit and power electronics can be consolidated.

In another particularly advantageous embodiment of the invention, the two clutches are each actuated by an electromechanical actuator. An advantage of an electromechanical actuator is the single energy conversion, electrical-mechanical, from the already present electrical energy storage.

In a further advantageous embodiment of the invention, the drive device is designed as a pivotable rudder propeller. Due to the pivotability of the propeller in a horizontal pivot plane about an essentially perpendicular control axis, the ability to maneuver the sailing ship is improved and the propulsion efficiency is increased.

Such a hybrid drive is preferably operated in different operating modes, wherein in a first operating mode with a change of the travel direction of the ship, the direction of rotation of the propeller is reversed by means of reversing the direction of rotation of the electric machine operated as a motor.

Furthermore, in the first operating mode the first clutch is disengaged and the second clutch is engaged, wherein the electric machine acts as a motor and drives the propeller by means of the energy stored in the battery.

In a further embodiment, the hybrid drive system is driven in a second operating mode, in which the first and the second clutches are engaged and a sailing ship is driven by the internal combustion engine. In this case, the electric machine is electrically switched off. The second operating mode offers advantages primarily at average and high speeds or heavy current conditions because in this case, high torques are required for driving the ship, and therefore the internal combustion engine is driven at or near its minimum consumption range.

Furthermore it is possible that the hybrid drive system operates in a third operating mode in which the first clutch is engaged and the second clutch is disengaged, wherein the internal combustion engine drives the electric machine acting as a generator, and charges the electrical energy accumulator.

Beyond this, a fourth operating mode can be provided in which both clutches are engaged, wherein the internal combustion engine drives both the propeller as well of the electric machine. In this case, the electric machine is operated as a generator. This is advantageous in particular for travel conditions with low power needs, in which the internal combustion engine would operate at low torque, and therefore far outside of the minimum consumption range. Due to the power consumption of the electric machine operating as a generator, the torque of the internal combustion engine is increased and its working point shifted toward the minimum consumption range.

As an alternative to this, the hybrid drive system can be operated in a fifth operating mode in which, with both clutches engaged, the electric machine is operated as a motor so that both the electric machine and the internal combustion engine both drive the propeller. As a result, a peak need of drive power can be covered and in the case of high torque needs, the torque of the internal combustion engine can be reduced by the additionally switched electric machine operating at the motor.

In a further embodiment, the hybrid drive system is operated in a sixth operating mode in which the first clutch is disengaged and the second clutch is engaged. Due to the flow energy of the water flowing around the ship, the propeller acts as a turbine and drives the electric machine, which is acting as a generator for generating electrical energy, in particular for charging the electrical energy accumulator. In this operating mode, as an advantageous effect, electrical energy is generated purely regeneratively.

In a particularly advantageous further development of the method, in the sixth operating mode, the propeller acting as a turbine is driven by the flow energy of the water through which it travels with the ship driven by wind energy during sailing. As a result, electrical energy can be advantageously generated from wind power, which is a renewable and environmentally friendly energy source. With the electrical energy acquired in this way, the sailing ship is driven by an emission-free drive without fuel consumption when operating the motor as an electric machine.

Alternatively, in a seventh operating mode, when the ship is driven by wind, the first clutch is disengaged and the second clutch is engaged, wherein the electric machine acts as a motor and generates torque, whereby the rotation of the propeller is prevented and with it a rotation of the drive device, in order to prevent operating noise from the drive device.

In an advantageous embodiment of the method, it is possible to select between several control modes, where a first control mode is automatically selected after switching on the hybrid system, whereby the hybrid system is switched into the first operating mode. In this case, the drive occurs exclusively by the electric machine acting as a motor.

In this first control mode, the speed of the ship can be limited upwardly by a speed limit value. This results in the advantage that the consumption of the energy stored in the battery is kept low, and the operating time of the electrical energy accumulator is thereby maximized. In the first control mode, the reversing can occur by reversing the direction of rotation of the electric machine so that an additional mechanical reversing device is not required.

In a variant of the method it is possible that, in the first control mode, the speed limit value may be exceeded for a limited time. As a result, it is possible to cover a brief power requirement in emergency situations or in maneuvering mode.

Preferably the method provides a second control mode in which, depending on the desired speed or the quantity of energy stored in the electrical energy accumulator, the hybrid system automatically switches between the first, second and fourth operating modes. This advantageously allows that the internal combustion engine and the electric machine are operated in their respectively most effective operating range.

In a further embodiment of the method, it is possible that a third control mode can be selected for the sailing mode. In this case, with the selection of the third control mode, the hybrid system switches into the sixth operating mode. Furthermore, the rudder propeller is pivoted automatically about its control axis counter to the set direction, or by 180, with respect to the setting that it assumes during straight travel driven by either the internal combustion engine or the electric machine.

Furthermore, a variant of the method shows that with the selection of a fourth control mode the hybrid system changes to the third operating mode.

BRIEF DESCRIPTION OF THE DRAWINGS

Exemplary embodiments of the invention are represented in the figures and are described in more detail in the following.

The drawings show in.

DETAILED DESCRIPTION OF THE PREFERRED EMBODIMENTS

Figure 1:
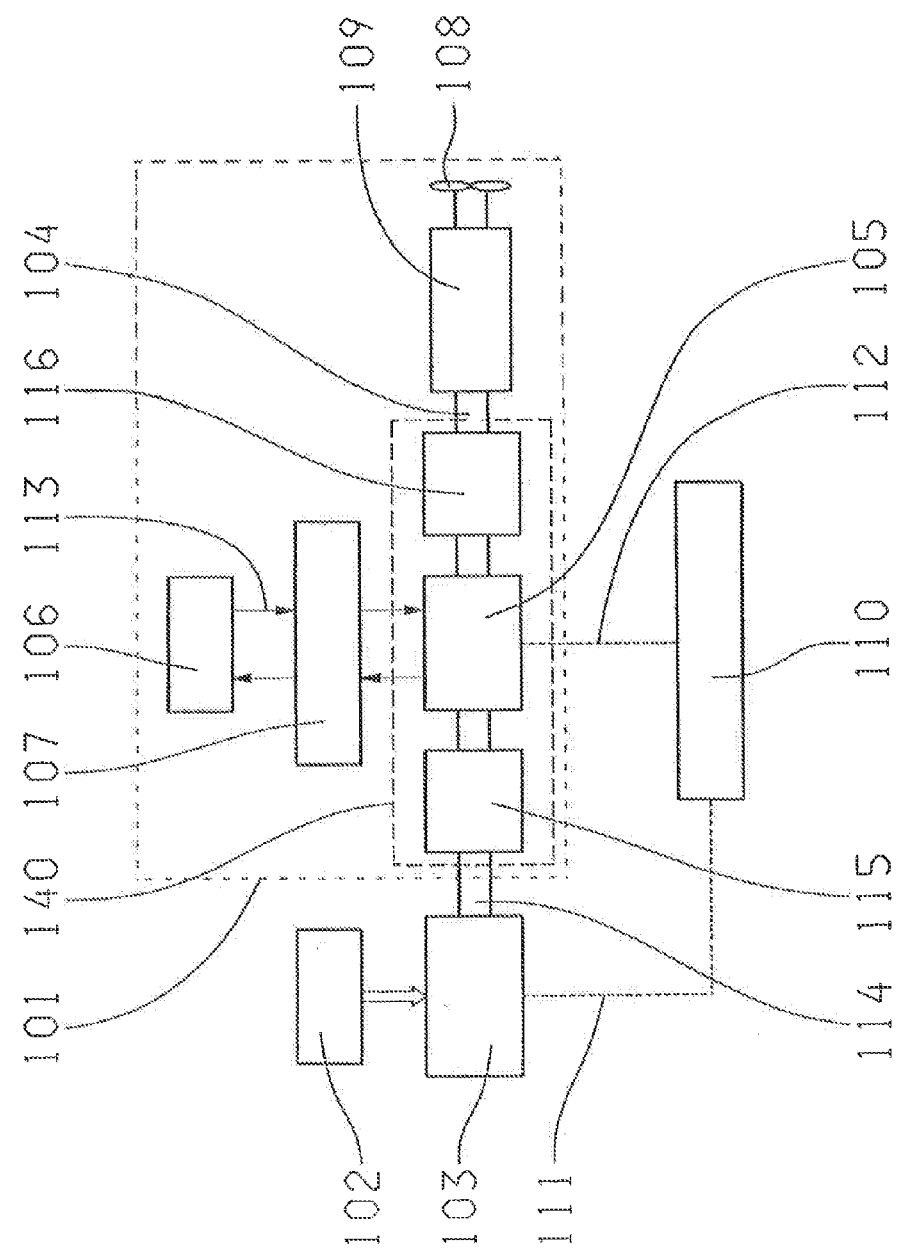
FIG. 1 a schematic representation of a hybrid system of a ship according to the invention, FIG. 2 a sectional representation of a drive unit according to the invention, FIG. 3 a perspective view of a drive unit according to the invention seen from the left side in the direction of travel, FIG. 4 a perspective view of a drive unit according to the invention seen from the right side in the direction of travel, and FIG. 5 a perspective view of the drive unit according to the invention with drive device and propeller.

FIG. 1 shows a schematic representation of a hybrid drive system for a ship according to the invention. According to the definition, a hybrid system contains at least two energy converters, each having an energy accumulator system. The hybrid system according to the invention comprises an internal combustion engine 103 with a fuel tank 102 as an energy accumulator, and an electric machine 105 with an electrical energy accumulator 106. The hybrid drive system is arranged as a so-called parallel hybrid system, i.e. the internal combustion engine 103 and the electric machine 105 can both selectively directly drive the drive, in this case a propeller 108.

The electric machine 105 together with a clutch 115 and a clutch 116 form a drive unit 140. The drive unit 140 together with power electronics 107, the battery 106 and a drive device 109 forms an electric hybrid unit 101. The drive device 109 drives a propeller 108. The internal combustion engine 103 and the electric hybrid unit 101 are controlled by an electronic control unit 110 via the electrical connections 111 and 112, wherein the control unit 110 determines different operating modes of the hybrid drive system. The ship's driver can select different control modes that are stored in the electronic control unit 110, for example. The respective control mode determines the operating modes to be engaged.

The clutch 115 is disposed between the electric machine 105 and an output shaft 114 of the internal combustion machine 103, and the clutch 116 is disposed between the electric machine 105 and an input shaft 104 of the drive device 109. The electric machine 105, the internal combustion engine 103, and the drive device 109 can be connected together in a rotationally fixed manner by means of the clutches 115 and 116.

Depending on the control by the electronic control unit 110 using the power electronics 107, the electric machine 105 can be operated as a generator or a motor as a function of the respective operating mode. In generator mode, the battery 106 is charged using power electronics 107. With a reversal of the charging direction 113, the electric machine 105 is operated as a motor using the electrical energy stored in the battery 106.

A purely electric drive of the ship can occur in a (first) operating mode with a disengaged clutch 115 and an engaged clutch 116. The electric machine 105, is driven by the electrical energy stored in the battery 106 with appropriate control by the electronic control unit 110 or the power electronics 107, and in this case, the internal combustion engine 103 is switched off. In particular at low ship speeds, an electric drive is advantageous because here the operating point of the internal combustion engine 103 is far outside of the range of minimum consumption in the fuel consumption map. In this way, it is possible to operate the ship without noise and exhaust in surroundings where there are noise regulations or environmental regulations requiring this.

A further advantage of the electric drive is the possibility of reversing the direction of rotation of the electric machine 105 for reversing the travel direction of the ship. This is a great advantage for maneuvering, for example. In the drive device 109, no reversing clutch is needed, in contrast to the prior art. Furthermore, electric drive permits precise maneuvering because the rotational speed of the electric machine 105, and with it the rotational speed of the propeller, can be changed up to stopping.

In a second operating mode, the electric machine 105 can also be switched off and can be rotated concurrently without load by the internal combustion engine 103 using the electronic control unit 110 and the power electronics 107 so that the drive power of the internal combustion engine 103 alone acts on the propeller 108.

In a third operating mode, the clutch 115 is engaged, and the clutch 116 is disengaged, so that the internal combustion engine 103 can drive the electric machine 105 and, using it as a generator, can charge the battery 106 without driving the ship. This operating mode is possible while the ship is at standstill or while it is sailing. With the same setting of the clutches 115 and 116, the electric machine 105 in motor mode can act as a starter and start the internal combustion engine 103.

In the case of a failure in the electronics or the battery 106, a separate auxiliary battery (not shown) can be provided for starting the internal combustion engine 103. In order to make emergency shifting possible, the clutches 115 and 116 are configured so that they can be engaged in a current-less state using elastic elements, disk springs in this example, so that the propeller 108 can be driven by the internal combustion engine 103 at any time.

In a fourth operating mode in a travel range of average or higher ship speed, both clutches 115 and 116 are engaged, and the internal combustion engine 103 can drive the propeller 108. In this setting of the clutches 115 and 116, the electric machine 105 can be operated as a generator so that the internal combustion engine 103 drives both the propeller 108 as well as the electric machine 105 acting as a generator, and therefore charges the battery 106.

Likewise in a further (fifth) operating mode, with a sufficiently charged battery 106, it is conceivable to operate the electric machine 105 in addition to the internal combustion engine 103, wherein the drive power of the internal combustion engine 103 and the electric machine 105 are added together and can cover a brief peak requirement for drive power. This operating mode is also called "boost mode". In the same configuration, the internal combustion engine 103 can be unloaded also due to the additional power of the electric machine 105. The operating point of the internal combustion engine 103 in the fuel consumption map lies at or near the range of minimum consumption because at average or higher ship speeds, the internal combustion engine 103 is operated at relatively high loads.

Furthermore, a sixth operating mode is possible in which the clutch 115 is disengaged, and the clutch 116 is engaged. In this case, the electric machine 105 is switched as a generator that during sailing, due to the speed of the current relative to the ship, is driven by the propeller 108 acting as a turbine, using the drive device 109 and the engaged clutch 116, and charges the battery 106. This option is particularly advantageous, because ultimately the electrical energy is recuperatively generated by wind power or water power without consuming fuel, and without the negative environmental influences associated with it. The decoupled internal combustion engine 103 is either switched off or runs. The same effect can be obtained in flowing water for both a motor ship as well as in a sailing ship, for example when the ship is anchored and the water flows about the ship's hull.

If the battery 106 is completely charged during sailing mode and the clutch 116 is disengaged to allow the propeller 108 to run concurrently without load, a disadvantageous running noise arises due to the spinning of the drive device 109 without load. To avoid this, in a seventh mode, the electric machine 105 is controlled so that it builds torque. Appropriately controlling the electric machine 105 being operated as a motor, results in stopping the propeller 108.

The different operating modes depend on the control mode selected by the boat's driver.

Thus, after switching on and initializing the hybrid system, a control mode A is selected automatically as a basic setting, in which the hybrid drive is switched into the first operating mode in which only a purely electric drive can occur. A drive lever is initially located in a N setting, and the electric machine 105 acts as a motor. By moving the drive lever, the electric machine 105 drives at a minimum rotational speed and the ship moves slowly. As a result, the ship can be gently maneuvered from a standstill, or can be started-up. Furthermore, in the first control mode, the ship can be driven at low speed. Reversing occurs in an analogous manner, where the drive lever is moved into the reverse direction and the electric machine changes its direction of rotation. As an advantageous result of this, no mechanical reverse mechanism is required.

With the electric drive, the ship cannot exceed a defined speed limit, or can exceed it only for a limited time, in order to keep the consumption of electrical energy low, and thereby to maximize the running time of the battery. A consumption of electric energy above the defined speed limit value is not permissible beyond a time-limited duration for emergencies and maneuvering operation.

If the second control mode is selected, the internal combustion engine 103 is started by the electronic control unit 110. Now in the second control mode, depending on the speed requirements selected using the drive lever, or the charging state of the battery 106 recorded in the electronic control unit 110, the hybrid system automatically switches between the first, second and fourth operating modes, that is, between an electric drive and an internal combustion engine drive.

After starting the internal combustion engine 103, it runs for a specific time at an idling speed. Engaging the clutch 115 is performed only after the rotational speed of the started internal combustion engine 103 has been matched to the still running electric machine 105, for example, by an acceleration of the rotational speed of the internal combustion engine 103 to the rotational speed of the electric machine 105. As a result, a higher gear shifting comfort is attained when engaging the clutch 115.

Now, if the speed of the ship is to be increased, the hybrid system remains in the second operating mode, and is driven using the internal combustion engine 103. If the speed falls below the defined speed limit value, the mode automatically switches into the first operating mode to purely electric drive. As a result, with the clutch 115 disengaged, the internal combustion engine 103 can now be switched off or it can run. If in the first operating mode, the quantity of stored electrical energy falls below a defined minimal value, the electronic control unit 110 automatically switches into the fourth operating mode, and the internal combustion engine 103 is started in order to drive the electric machine 105 acting as a generator to charge the battery 106. At the same time, in the fourth operating mode, the internal combustion engine 103 drives the propeller 108 and thus, the ship. Upon reaching a defined charge state of the battery 106, the electronic control unit 110 switches the hybrid system into the first or second operating mode, depending on the current or desired speed.

If a sailing ship is in sailing mode, the boat's driver can select a third control mode, and the electronic control unit 110 switches the hybrid system into the sixth operating mode, i.e. the clutch 115 is disengaged and the clutch 116 is engaged. Additionally in the third control mode, a drive device 109 designed as a rudder propeller is rotated in opposite position or at 180° to the direction for straight travel with the drive. The blade profile of the propeller 108 to the flow direction is now such that a higher efficiency is attained for the conversation of water flow energy into mechanical energy. The mechanical energy is converted, in the electric machine 105 acting as a generator, into electrical energy for charging the battery 106.

Because the drive of the electric machine 105 using the propeller 108 generates a resistance force depending of the desired charging current, the sailing ship loses speed in this operating mode. Therefore, the boat's driver can determine the charging current using the drive lever. So for example, with the drive lever in the N position, there is no charging of the battery 106. The more inclined the drive lever, the more charging current is generated for charging the battery 106, and the greater the current resistance caused by the propeller 108, or the electric machine 105 acting as a generator. The maximum possible charging current ultimately depends on the supply of wind power.

Alternatively, the battery can be charged automatically by wind energy in sailing mode only after a defined minimum speed is reached, below which the propeller 108 also rotates without load by disengaging the clutch 116.

If the battery 106 is to be charged when the ship is at standstill, the boat's driver can select the fourth control mode. In this case, the electronic control unit 110 switches the hybrid system into the third operating mode. The clutch 115 between the internal combustion engine 103 and the electric machine 105 is now engaged and the internal combustion engine 103 now drives the electric machine 105 operating as a generator. The clutch 116 between the electric machine 105 and the propeller 108 is disengaged so that there is no drive for the ship.

Figure 2:
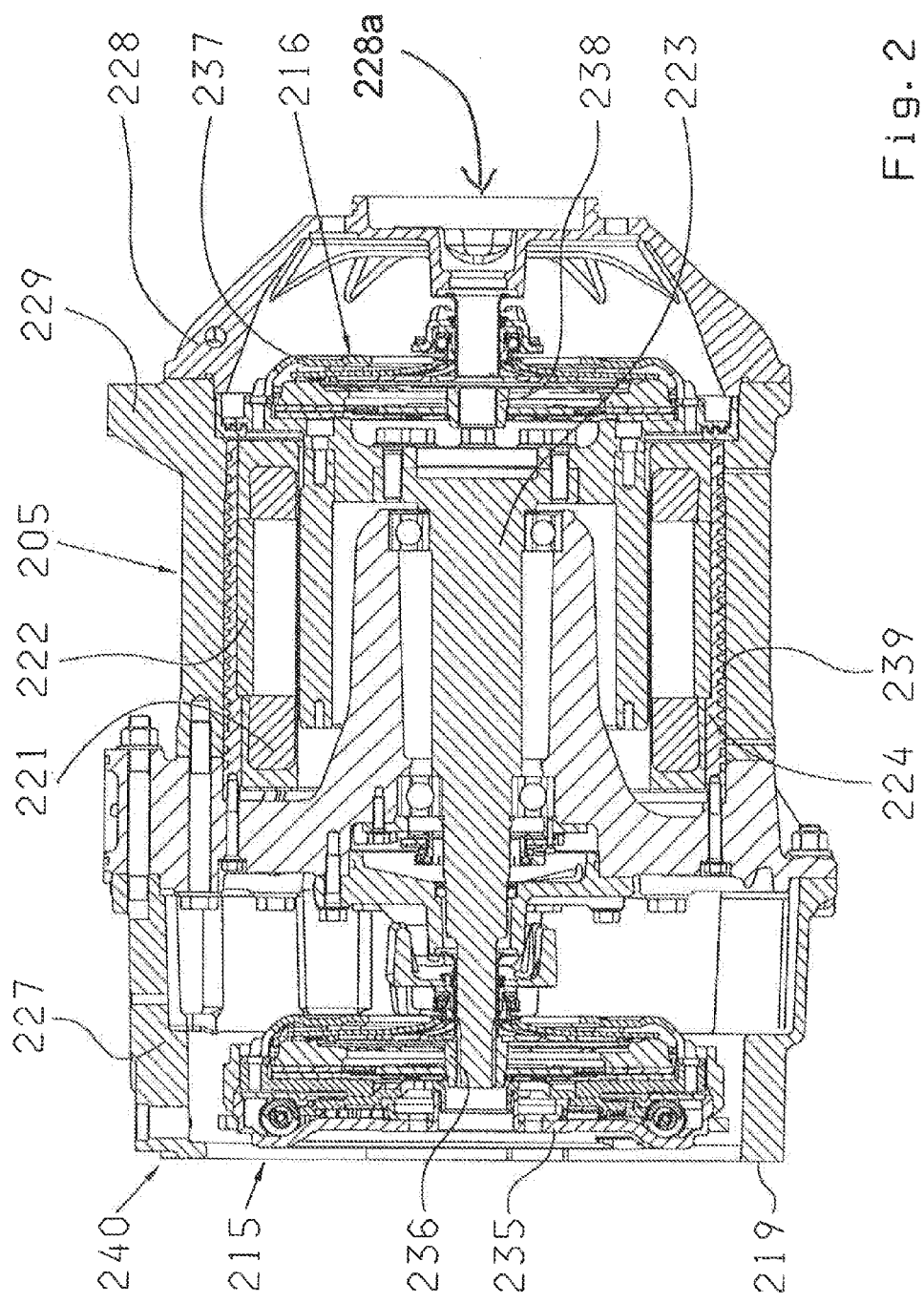

FIG. 2 shows an electric drive unit 240 according to the invention which comprises an electric machine 205, a clutch 215 and a clutch 216. The electric machine 205 is designed as a twelve pole brushless synchronous machine. It comprises a stator 221 and a rotor 222, wherein the rotor 222 is connected to a shaft 223 in a rotationally fixed manner. The stator 221 is disposed rotationally fixed in a cylindrical cooling jacket 224, wherein the cooling jacket 224 is, in turn, connected to a machine housing 229 in a rotationally fixed manner. In order to cool the electric machine 205, which heats during operation, cooling channels 239 are formed between the cooling jacket 224 and the machine housing 229; coolant flows through these channels, for example water from the body of water traveled through. The shaft 223 and with it, the rotor 222 as well, are pivotably mounted in the machine housing 229.

Figure 5:
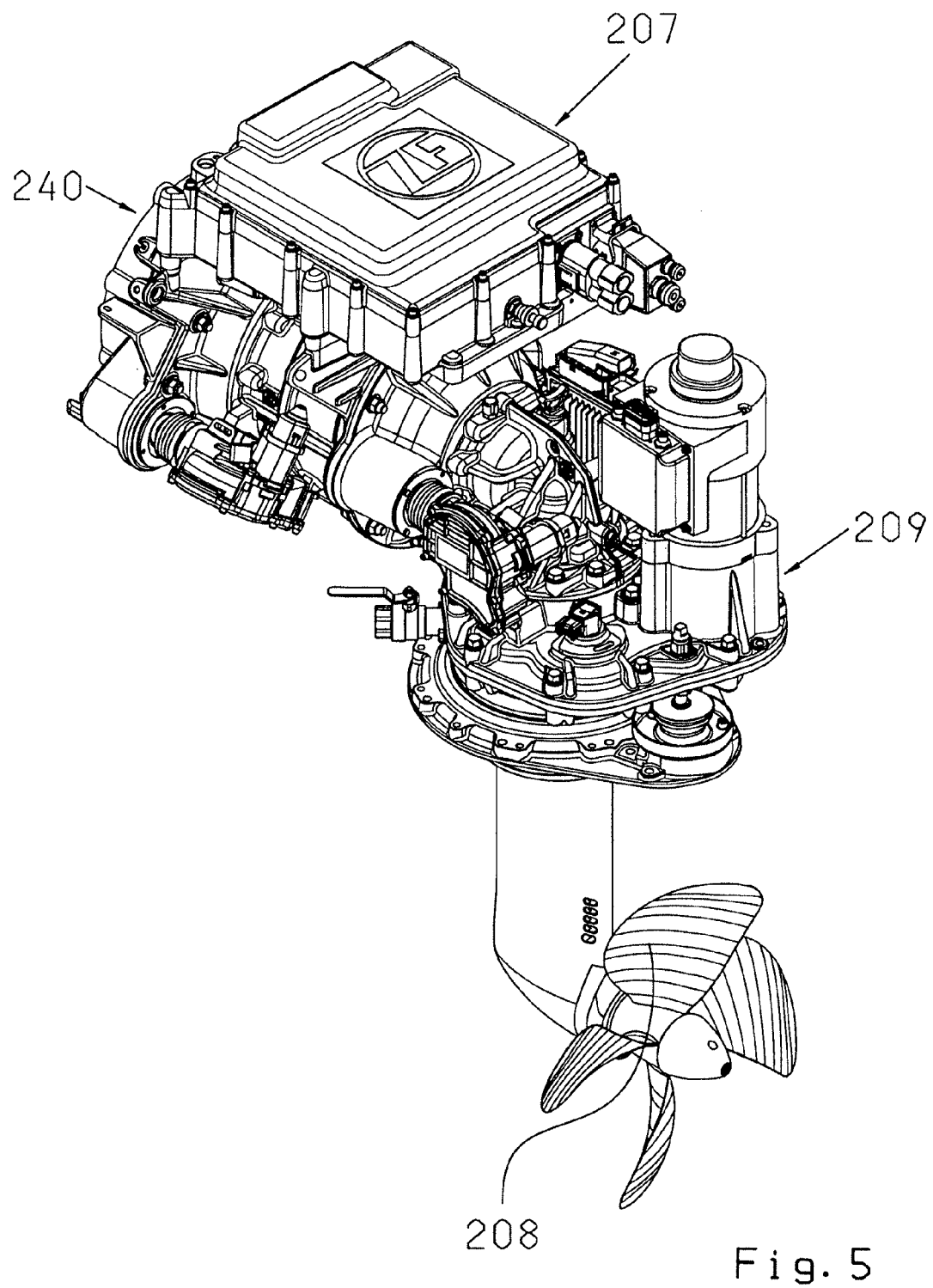

The clutches 215 and 216 are implemented as dry running frictionally engaged disk clutches. The clutch 215 comprises a disk-shaped drive element 235 and a drive element 236, wherein the drive element 235 is connected in a rotationally fixed manner to a drive shaft of the internal combustion engine, and the drive element 236 is connected in a rotationally fixed manner to the shaft 223 of the electric machine 205. The clutch 216 comprises a disk-shaped drive element 237 and a drive element 238, wherein the drive element 237 is connected in a rotationally fixed manner to the rotor 222 and the shaft 223 of the electric machine 205. The output element 238 is connected in a rotationally fixed manner to an input shaft of the drive device 209, which is shown in FIG. 5.

The clutch 215 is enclosed radially by a tubular clutch housing 227, and towards the internal combustion engine has a flange-mounting surface 219 for connection to an internal combustion engine. The clutch 216 is enclosed by a clutch case 228 that has an outlet 228a in the center through which it is possible to connect a shaft to a drive device. The clutch housing 227 and the clutch case 228 are each screwed axially to the machine housing 229 and thus form the housing of the drive unit 240.

Figure 3:
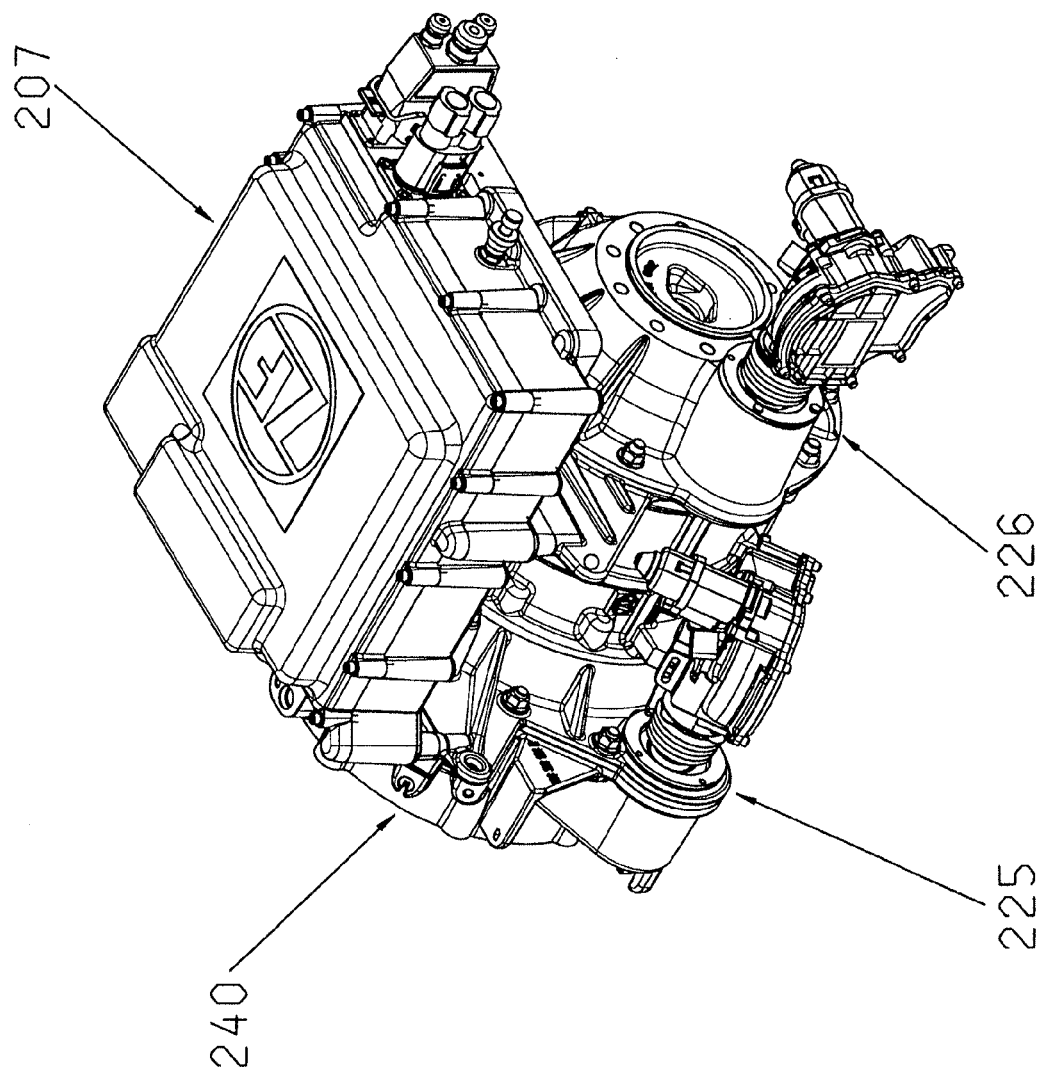

FIG. 3 shows a perspective exterior view of the drive unit 240 seen from the left side in the travel direction. Power electronics 207 are disposed in a compact manner at the drive unit 240. Likewise, an electric actuator 225 for actuating the clutch 215 and an electric actuator 226 for actuating the clutch 216 are disposed on the outside of the drive unit 240. As a result, the electric actuator 225 is connected to the clutch housing 227, and the electric actuator 226 is connected to the clutch case 228. Here, both electric actuators are designed as linear actuators.

The power electronics comprise a control unit that is composed of two AC/DC rectifiers and two DC converters. Using the AC/DC rectifiers, the electric energy from the electric energy accumulator is converted into alternating current for driving the electric machine operating as a motor, or alternating current generated by the electric machine is converted into direct current for charging the electric energy accumulator. When this ship is docked, using a second AC/DC converter, the alternating current from the electric grid on land is converted into direct current for charging the electric energy accumulator. Furthermore, the AC/DC converter converts direct current from the battery into alternating current for operating electric onboard devices. A first DC converter is used for supplying onboard devices with low voltage, or for charging the electrical energy accumulator units with low voltage. A second DC converter supplies the electrically driven pump for coolant.

Figure 4:
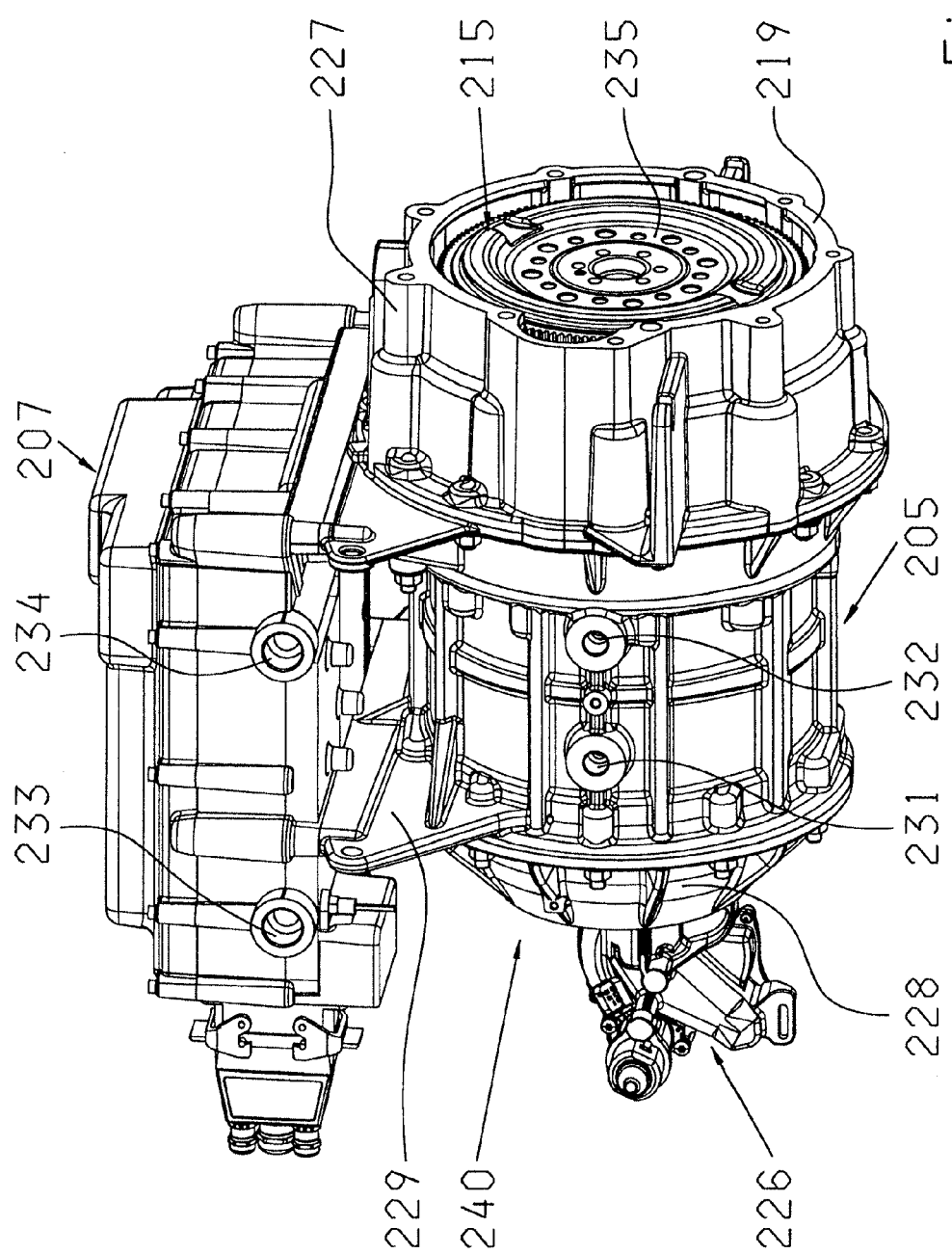

FIG. 4 shows the drive unit 240 in perspective seen from the right side in the travel direction. The power electronics 207 are disposed on top of the drive unit 240, and are securely connected to the machine housing 229. The side of the clutch 215 facing the internal combustion engine is radially enclosed by the clutch housing 227, as shown in section in FIG. 2. A connection surface of the clutch 215 is facing the internal combustion engine side, likewise the flange connection surface 219. At the stern end of the drive unit 240, the clutch case 228 is connected to the machine housing, wherein the electric actuator 226 is disposed at the clutch case 228.

The heat arising during operation in the power electronics 207 and the electric machine 205 must be dissipated. For this purpose, two coolant connections 233 and 234 are provided in the power electronics 207, wherein the coolant for the power electronics 207 flows in through one of the two coolant connections, and flows out through the other. The electric machine 205 is cooled in the same manner through the coolant connections 231 and 232. In use as a ship drive, water is a preferred coolant, for example, it is removed from the body of water being traveled through by means of a pump, and supplied to the components to be cooled. After exiting from the respective coolant connection, the heated coolant is returned to the body of water.

FIG. 5 shows the drive unit 240 with the power electronics 207. A drive device 209 is disposed at the drive unit 240, at which a propeller 208 is disposed in a rotatable manner. For this purpose, the drive device 209 is built as a pivotable ship drive that is also known as a so-called pod drive or rudder propeller. Here, the direction of thrust of the propeller 208 can be changed in an approximately horizontal pivot plane, which along with the positive effects of good propulsion efficiency, also offers good maneuverability, particularly during docking and casting-off.

REFERENCE CHARACTERS

101 electric hybrid unit
102 fuel tank
103 internal combustion engine
104 drive device input shaft
105 electric machine (motor/generator)
106 battery
107 power electronics
108 propeller
109 drive device
110 electronic control unit
111 electrical connection
112 electrical connection
113 charging direction
114 internal combustion engine output shaft
115 clutch
116 clutch
140 drive unit
205 electric machine (motor/generator)

207 power electronics
208 propeller
209 drive device
215 clutch
216 clutch
219 flange connection surface
221 stator
222 rotor
223 shaft
224 cooling jacket
225 electric actuator
226 electric actuator
227 clutch housing
228 clutch case
229 machine housing
231 coolant connection
232 coolant connection
233 coolant connection
234 coolant connection
235 drive element
236 output element
237 drive element
238 output element
239 cooling channel
240 drive unit

The invention claimed is:

1. A method of operating a hybrid drive system of a sailing ship comprising an internal combustion engine (103), an electric machine (105, 205) which operates as a either a generator or a motor, depending on a circuit of an electric controller (107, 207), a battery (106), at least one shift clutch (115, 116, 215, 216) and a pivotable drive device (109, 209) for transferring drive power to at least one propeller (108), the electric machine (105, 205) together with a first clutch (115, 215) and a second clutch (116, 216) form modular a drive unit (140, 240) which is enclosed by a common housing (227, 228, 229), the housing has a flange surface (219) for connecting the internal combustion engine, and the drive unit is modularly disposed between the internal combustion engine (103) and the drive device (109), the first clutch (115, 215) is disposed between the electric machine (105, 205) and the internal combustion engine (103), and the second clutch (116, 216) is disposed between the electric machine (105, 205) and the drive device (109, 209), the method comprising the steps of:
  operating the hybrid drive system in a first operating mode in which the electric machine (105, 205) operates as a motor for changing a direction of travel of the ship by reversing a direction of rotation of the electric machine (105, 205) to reverse a direction of rotation of the propeller (108, 208); and
  operating the hybrid drive system in a seventh operating mode while the sailing ship being driven by wind power in which the electric machine (105, 205) is operating as a motor and generates torque which prevents rotation of the propeller (108, 208) and rotation of the drive device (109, 209), to prevent running noise of the drive device (109, 209).

2. The method according to claim 1, further comprising the step of the operating the hybrid drive system in the first operating mode in which the electric machine (105, 205) operates as a motor and disengaging the first clutch (115, 215) and engaging the second clutch (116, 216) to drive the propeller (108, 208) with energy stored in the battery (106).

3. The method according to claim 1, further comprising the step of operating the hybrid drive system in a second operating mode, in which the first clutch (115, 215) and the second clutch (116, 216) are engaged, and the ship is driven by the internal combustion engine (103), and the electric machine (105, 205) is electrically switched off.

4. The method according to claim 1, further comprising the step of operating the hybrid drive system in a third operating mode, in which the first clutch (115, 215) is engaged and the second clutch (116, 216) is disengaged, and the internal combustion engine (103) drives the electric machine (105, 205) operating as a generator for charging the battery (106).

5. The method according to claim 1, further comprising the step of operating the hybrid drive system in a fourth operating mode in which both of the first and the second clutches (115, 116, 215, 216) are engaged and the internal combustion engine (103) drives both the propeller (108, 208) and the electric machine (105, 205) operating as a generator.

6. The method according to claim 1, further comprising the step of operating the hybrid drive system in a fifth operating mode, in which both of the first and the second clutches (115, 116, 215, 216) are engaged, the electric machine (105, 205) operating as a motor, and together with the internal combustion engine (103) drives the propeller (108, 208).

7. The method according to claim 1, further comprising the step of automatically setting a first control mode immediately after switching on the hybrid system such that the hybrid system is switched into the first operating mode when several control modes are selectable.

8. The method according to claim 7, further comprising the step of upwardly limiting a speed of the electric motor by a speed limit value in the first control mode.

9. The method according to claim 8, further comprising the step of permitting the speed limit value to be exceeded for a limited time in the first control mode.

10. The method according to claim 7, further comprising the step of automatically switching the hybrid system, in a second control mode, between the first operating mode, a second operating mode and a fourth operating mode depending on either a desired speed or a quantity of energy stored in the battery (106).

11. The method according to claim 1, further comprising the step of selecting a third control mode for a sailing operation, in which the hybrid system is switched into a sixth operating mode, and a rudder propeller is automatically pivoted around a control axis in an opposite direction relative to a position the ruder propeller is in with straight travel driven by either the internal combustion engine (103) or electric machine (105).

12. The method according to claim 11, further comprising the step of switching the hybrid system to the third mode of operation with the selection of a fourth control mode.

13. A method of operating a hybrid drive system of a ship comprising an internal combustion engine (103), an electric machine (105, 205) which operates as a either a generator or a motor, depending on a circuit of an electric controller (107, 207), a battery (106), at least one shift clutch (115, 116, 215, 216) and a pivotable drive device (109, 209) for transferring drive power to at least one propeller (108), the electric machine (105, 205) together with a first clutch (115, 215) and a second clutch (116, 216) form modular a drive unit (140, 240) which is enclosed by a common housing (227, 228, 229), the housing has a flange surface (219) for connecting the internal combustion engine, and the drive unit is modularly disposed between the internal combustion engine (103) and the drive device (109), the first clutch (115, 215) is disposed between the electric machine (105, 205) and the internal combustion engine (103), and the second clutch (116, 216) is disposed between the electric machine (105, 205) and the drive device (109, 209), the method comprising the steps of:

operating the hybrid drive system in a first operating mode in which the electric machine (105, 205) operates as a motor for changing a direction of travel of the ship by reversing a direction of rotation of the electric machine (105, 205) to reverse a direction of rotation of the propeller (108, 208);

operating the hybrid drive system in a seventh operating mode while the sailing ship being driven by wind power in which the electric machine (105, 205) is operating as a motor and generates torque which prevents rotation of the propeller (108, 208) and rotation of the drive device (109, 209), to prevent running noise of the drive device (109, 209); and operating the hybrid drive system in a sixth operating mode in which the first clutch (115, 215) is disengaged and the second clutch (116, 216) is engaged such that the propeller (108, 208) operates as a turbine, and a flow energy of water flowing around the ship, drives the electric machine (105, 205) which operates as a generator for generating electrical energy.

14. The method according to claim 13, further comprising the step generating electrical energy from the flow energy of the water when the ship is sailing by wind energy with the propeller (108, 208) acting as a turbine.

\* \* \* \* \*